3,232,992
PREPARATION OF MERCAPTANS USING THIOMALIC ACID
David M. Marquis, Orinda, and William G. Toland, San Rafael, Calif., assignors to Chevron Research Company, San Francisco, Calif., a corporation of Delaware
No Drawing. Filed May 29, 1963, Ser. No. 283,992
5 Claims. (Cl. 260—609)

This invention concerns the preparation of hydrocarbylthiols from thiomalic acid. More particularly, this invention concerns the preparation of hydrocarbylthiols from thiomalic acid which provides a method using α-olefins and hydrogen sulfide with maleic anhydride as an intermediate to transfer the hydrogen sulfide to the α-olefin.

Primary mercaptans or thiols can be used for a variety of functions. They find use as telogens, as precursors to sulfonic acids, as modifiers in free-radical reactions, etc. Attempts at preparing the 1-thiols from hydrogen sulfide and α-olefins in the presence of ultraviolet light or free-radical catalysts result in significant amounts of the sulfide. U.S. Patent Nos. 2,551,813 and 2,865,965 both disclose the addition of hydrogen sulfide to 1-olefins with the concomitant formation of the sulfide.

It has now been found that 1-thiols can be prepared from α-olefins and hydrogen sulfide or its salts without the side reaction of the formation of the sulfide by using maleic acid or its anhydride as a hydrogen sulfide transfer agent. The process comprises the formation of thiomalic acid from maleic acid and hydrogen sulfide, the addition of an olefin to thiomalic acid to form the S-alkyl thiomalic acid and then dehydration followed by pyrolysis or concurrent dehydration and pyrolysis to reform maleic anhydride and yield the desired 1-thiol. The maleic anhydride can then be recycled back and used to reform thiomalic acid with hydrogen sulfide.

Thiomalic acid may be prepared from maleic acid and hydrogen sulfide in a variety of ways. In British Patent No. 670,702 a method is described using maleic acid and sodium hydrosulfide in the presence of sodium hydroxide. The sodium hydrosulfide can be prepared by using hydrogen sulfide and an excess of sodium hydroxide. See also A. Emr. et al., Chem. Listy 50 664–6 (1956); C.A. 50 8460 f. (1956).

Because the maleic acid can be recovered and used for the prepartion of thiomalic acid, the cylic process has significant economic advantages. The cyclic process avoids the formation of disulfide, while permitting the preparation of primary mercaptans from α-olefins and hydrogen sulfide without significant loss of other materials. However, the novel pyrolysis of S-alkyl thiomalic acid does not require that the thiomalic acid used for the preparation of the S-alkyl derivative be derived from maleic acid.

The next step of the cyclic process is the addition of the α-olefin to thiomalic acid to form S-alkyl thiomalic acid. In the absence of oxygen, the fortuitous amount of peroxide present in most olefins is sufficient to catalyze the reaction to 85% conversion or better. However, to carry the reaction further, or if the reaction is carried out in the presence of oxygen, it is preferred to have an added free-radical source: organic compounds which decompose thermally to free radicals e.g., azo compounds, such as azobisisobutyronitrile, peroxides, such as benzoyl peroxide, cumyl hydroperoxide, etc., or ultraviolet light to form thiyl radicals.

The α-olefins will customarily be in the range of 3 to 25 carbons, preferably 6 to 18 carbons. Preferably, there is no alkyl substitution on the 2-carbon of the olefin. The latter range of olefins provides mercaptans of particular commercial interest which are not readily obtained in high yield by other means. Olefins included in this invention are propene, 1-butene, 4-methylpentene-1, 1-heptene, 5-methylhexene-1, 1-tetradecene, 1-heptadecene, 1-octadecene, 1-nonadecene, 1-pentadecene, etc.

The solvent for the addition reaction will be dependent upon the method of catalysis used. Solvents which find use are alcohols, particularly lower alkanols, aromatic compounds, such as benzene, chlorobenzene, etc. The temperature will also depend on the catalyst, and will usually be in the range of about 0 to 100°. Methods for adding mercaptans to olefins are well known in the art and extensive description of the method is not required.

If isolation of the S-alkyl thiomalic acid is desirable, it can then be isolated by various methods known in the art, such as extraction, crystallization, etc. However, the S-alkyl thiomalic acid can be used directly.

The S-alkyl thiomalic acid is then dehydrated to form the S-alkyl thiomalic anhydride and pyrolyzed to yield maleic anhydride and the 1-thiol, or the dehydration and pyrolysis can be combined into one step.

When S-alkyl thiomalic acid is directly pyrolyzed to the mercaptan, it is found that some decarboxylation occurs. Also, the yield of the mercaptan is lower. It is, therefore, preferred to pyrolyze the anhydride rather than the acid to the 1-thiol. The pyrolysis of the acid is carried out under the same conditons as the anhydride. The products are the 1-thiol and usually the maleic anhydride reacts with the water formed to regenerate the acid.

The dehydration of the S-alkyl thiomalic acid can be readily accomplished by both thermal and chemical means. The S-alkyl thiomalic acid may be heated at a temperature in the range of about 150° to 250° C. until no more water distils off. Depending on the temperature, the time will vary from a few minutes to a few hours. If desired, reduced pressure can be used to remove the water more readily. Chemical means of dehydration may also be used. The S-alkyl thiomalic acid can be heated with dehydrating agents, such as acid anhydrides or halides, e.g., acetic anhydride, acetyl chloride, etc., and the S-alkyl thiomalic anhydride separated from the mixture.

The S-alkyl thiomalic anhydride is then pyrolyzed at a temperature of at least 325° C., preferably 350° C., and the resulting 1-thiol and maleic anhydride isolated. The temperature range will ordinarily be about 350° to 600° C., preferably 350° to 450° C., depending on the contact time. Higher temperatures are required for shorter contact times.

The pyrolysis can be carried out simply by dropping the S-alkyl thiomalic acid or anhydride on a hot surface or by passing it as a vapor through a hot tube. The contact time varies inversely with temperatures and will usually be in the range of about 0.01 to 5 seconds, preferably 0.1 to 3 seconds. The term contact time refers to the period of time which the feed is in a zone at or about the temperature for the reaction. When a vaporized feed is used, usually with a carrier gas, the contact time is calculated from the volume of the reaction zone and the feed rate, the amount of feed being expressed as the molar volume of the total feed at the reaction temperature.

The maleic anhydride and acid, if any has been hydrolyzed, may then be recycled and hydrated to maleic acid to be contacted with $H_2S$ or its inorganic derivatives, e.g., salts, to form thiomalic acid. Such salts as the alkali metal and ammonium salts find use.

The following examples are offered by way of illustration and not by way of limitation.

*Example I*

Into a flask equipped with gas inlet, addition funnel, an internal UV source and a stirrer was introduced a solution of 15 grams of thiomalic acid in absolute ethanol. The solution was purged with nitrogen for about 15 minutes and then stirred while 56 grams of 1-octene were added. Stirring was continued and the mixture irradiated for 4½ hours, at which time solvent and excess olefins were removed in vacuo. The solid residue was recrystallized from mixed hexanes to give a 97% yield (25.3 grams) of S-octyl thiomalic acid, M.P. 92–94° C., the yield based on unrecovered olefin.

*Example II*

Into a flask was introduced 15 grams of thiomalic acid, 175 grams of absolute ethanol, 11.2 grams of 1-octene and 0.33 gram of azobisisobutyronitrile. The solution was refluxed for 24 hours. Work-up of the reaction as previously described provided S-octyl thiomalic acid in 89.2% yield.

*Example III*

Following the procedure of Example I, 30 grams of thiomalic acid and 84 grams of 1-dodecene in ethanol solution were irradiated for 4 hours at room temperature. The weight of the product was 57.3 grams (90%) of S-dodecyl thiomalic acid, M.P. 97–98° C.

*Example IV*

Into a flask fitted with a short Vigreux column was introduced 21.25 grams of S-octyl thiomalic acid. The pressure was reduced to 2 mm. mercury and the flask heated to 170° C. with an oil bath and the temperature maintained until no more water distilled over. The bath temperature was then increased to about 220° C., the anhydride distilling over at 160° C. at 2 mm. mercury. The product weighed 17.7 grams for an 89% yield. A small amount of octyl mercaptan was found in a Dry Ice trap attached to the outlet of the distillation apparatus.

*Example V*

Into a 0.5-inch ID quartz tube packed with ⅛-inch glass helices heated over a 10-inch length with an external nichrome band was introduced S-octyl thiomalic anhydride at a rate of 1.3 grams per minute. The temperature was maintained at 400° C. and the tube swept with nitrogen at a rate of 100 cc. per minute. The contact time was 2.2 seconds. The product was trapped in a Dry Ice trap. Analysis of the condensate by infrared spectroscopy showed that a conversion of 71% was obtained with a 94% yield of octyl mercaptan.

The method above was repeated with a feed rate of 2.2 grams per minute, a nitrogen flow rate of 270 cc. per minute and a temperature of 405°. The contact time was 1 second. A 50% conversion was obtained with a 92% yield of octyl mercaptan.

The mixture of maleic anhydride and octyl mercaptan was extracted with hexane, the maleic anhydride remaining. The maleic anhydride is cycled back to the initial step, the preparation of the thiomalic acid.

Following the previous procedure with a feed rate of 1.03 grams per minute at a temperature of 425° C., and a contact time of 2.4 seconds, a conversion of 74.5% was obtained. The yield of N-octyl mercaptan was 84% and maleic anhydride was 100%.

*Example VI*

Into a flask fitted with a short Vigreux column, S-n-octyl thiomalic acid was introduced at a rate of 4.0 grams per minute for a contact time of 0.6 second, while the temperature was maintained at 485° C. A conversion of 59% was obtained. The yield of octyl mercaptan was 61% and maleic anhydride 84%.

*Example VII*

Following the procedure of Example V, S-dodecyl thiomalic anhydride was introduced at a rate of 7 grams per hour at a temperature of 390° F. to give N-dodecyl mercaptan and maleic anhydride in good yields.

As will be evident to those skilled in the art, various modifications on this process can be made or followed, in the light of the foregoing disclosure and discussion, without departing from the spirit or scope of the disclosure or from the scope of the following claims.

We claim:

1. A method of preparing 1-alkylthiols of from about 3 to 25 carbon atoms which comprises pyrolyzing an S-hydrocarbyl thiomalic anhydride at a temperature in the range of about 325 to 600° C. at a contact time in the range of about 0.01 to 5 seconds.

2. A method of preparing 1-alkylthiols of from about 3 to 25 carbons from 1-olefins and hydrogen sulfide which comprises:

adding an α-olefin of from 3 to 25 carbons to thiomalic acid by free-radical means and forming S-(1-alkyl) thiomalic acid;

pyrolyzing said S-(1-alkyl) thiomalic acid at a temperature in the range of about 325° to 600° C. at a contact time in the range of about 0.01 to 5 seconds to form a primary 1-thiol of from 3 to 25 carbons and at least one member of the group consisting of maleic acid and maleic anhydride;

separating the thiol and at least one member of the group consisting of maleic acid and maleic anhydride;

hydrating any maleic anhydride and maleic acid and recycling said maleic acid to be used in the formation of thiomalic acid.

3. A method according to claim 2 wherein the pyrolysis is carried out at reduced pressures.

4. A method according to claim 2 wherein said pyrolysis is preceded by dehydration of the S-(1-alkyl) thiomalic acid to S-(1-alkyl) thiomalic anhydride by heating the S-(1-alkyl) thiomalic acid at a temperature in the range of about 150° to 250° C. until at least about the theoretical amount of water is removed.

5. A method according to claim 2 which comprises dehydrating the S-(1-alkyl) thiomalic acid to S-(1-alkyl) thiomalic anhydride and pyrolyzing said S-(1-alkyl) thiomalic anhydride at a temperature in the range of about 350 to 500° C.

No references cited.

CHARLES B. PARKER, *Primary Examiner.*